United States Patent [19]

Lewis, II

[11] 4,270,440
[45] Jun. 2, 1981

[54] HIGH PRESSURE PISTON AND SEAL

[75] Inventor: Edwin C. Lewis, II, Houston, Tex.

[73] Assignee: Weatherford/DMC, Houston, Tex.

[21] Appl. No.: 14,016

[22] Filed: Feb. 22, 1979

[51] Int. Cl.³ .............................................. F01B 31/00
[52] U.S. Cl. ........................................ 92/87; 92/182; 92/194; 92/240; 92/252
[58] Field of Search .................... 92/86.5, 87, 80, 251, 92/182, 240, 194, 253, 254, 252; 277/71, 72 R, 188 A, 188 R, 24, 70, 78; 417/900

[56] References Cited

U.S. PATENT DOCUMENTS

| | | | |
|---|---|---|---|
| 1,988,727 | 1/1935 | Godron | 277/70 |
| 2,367,185 | 1/1945 | Cary | 92/87 |
| 2,402,268 | 6/1946 | Young | 92/251 X |
| 2,420,104 | 5/1947 | Smith | 277/188 A |
| 2,529,053 | 11/1950 | Simmons | 92/182 X |
| 2,732,268 | 1/1956 | Duval | 277/78 |
| 2,739,855 | 3/1956 | Bruning | 277/188 A |
| 2,819,131 | 1/1958 | Lankford . | |
| 2,977,165 | 3/1961 | Olson . | |
| 2,987,354 | 6/1961 | Olson . | |
| 2,991,806 | 7/1961 | Rocheville et al. . | |
| 3,049,385 | 8/1962 | Smith | 277/188 R |
| 3,341,210 | 9/1967 | Vick | 277/188 R |
| 3,455,566 | 7/1969 | Hull et al. | 277/188 R |
| 3,540,745 | 11/1970 | Flock | 277/188 R |
| 3,565,446 | 2/1971 | Nyberg | 277/70 X |
| 3,678,809 | 7/1972 | Doutt | 277/71 X |
| 3,720,140 | 8/1971 | Lee | 92/87 |
| 4,157,057 | 6/1979 | Bailey | 92/87 |

FOREIGN PATENT DOCUMENTS 52-3985  1/1977  Japan .......................................... 92/182

Primary Examiner—Irwin C. Cohen
Attorney, Agent, or Firm—Fulbright & Jaworski

[57] ABSTRACT

In a pump having a cylinder liner, there is a piston therein, a seal around the piston and rear wearband around the piston body to align the piston within the liner. An elastomeric seal ring is in sealing and sliding contact with the liner. A gap filler, with minimal axial creep and controlled radial creep, abuts the rear surface of the seal and maintains continuous contact with the liner thereby continuously closing the extrusion gap between the gap filler and the liner as the liner wears. The wearband has a plurality of angled grooves longitudinally traversing it. Abrasive particles are directed within and through the grooves in the wearband while a source of liquid is communicated into the piston body, through water channels in the gap filler and through the flowpaths in the wearband to create a vortex action which washes the liner wall. The wearband insures no metal to metal contact between the piston and liner and provides a constant piston gap between the metal piston and liner. A thin seal ring improves the temperature gradient within the ring, controls the creep of the ring, reduce the axial load on the ring and allows rear removal of the ring without removing the piston from the liner.

13 Claims, 10 Drawing Figures

HIGH PRESSURE PISTON AND SEAL

PRIOR ART STATEMENT

Although considerable improvements have been made in sealing materials, the basic design of the slush pump or mud pump for oil field operations has generally remained constant during the past thirty-five years.

Traditional mud pumps have employed a one-piece molded rubber compound having a rigid or semi-rigid backing as an integral part of the molded rubber ("piston rubber"). The backing used in the piston rubber has included a woven fabric, a metal and a plastic-like material such as nylon.

The most common deficiency of slush pump pistons has been their wearing of the cylinder liner thereby leaving a gap between the rigid backing and the metal flange adjacent the backing and the liner wall. The resulting gap causes a portion of the rubber seal to extrude into the gap on the pressure stroke which, during the power stroke as well as on the return stroke of the piston, causes the extruded portion of the rubber seal to be nibbled away. As the material is nibbled from the seal, the piston continues to shift within the liner which in turn accelerates the wear on one side of the seal and the portion of the piston body contacting the liner wall. The one sided wear pattern causes continued extrusion of the seal into the gap, a wearing and degeneration of the rigid or semi-rigid backing of the seal and produces or accelerates the metal to metal contact between the metal flange and the liner. The metal removed from the liner wall by this metal to metal contact is deposited on the seal which causes the metal particles to be worked against the liner wall as an abrasive. Metal to metal contact between the piston body and the liner is so commonly and accepted in the current technology that manufacturers often locate a circumferential wear groove within the outer circumference of the piston body which, as the piston body is worn away, indicates the degree of wear on the piston body as well as the need to replace it. It is unclear whether the seal first moves thereby causing a shift of the flange or whether the flange itself is worn from metal to metal contact thereby causing the seal to shift and to extrude into the extrusion gap. The result, however, is a rapid deterioration of the liner wall, the rubber seal, the metal piston body and the effectiveness of the slush pump.

Rubber seals have historically been relatively large radially and axially in order to provide a bulk material which is worn and nibbled during the pumping cycle. The large seals expand from frictional heat, design preload and pressure exerted during the pumping stroke. The combined expansion exerts a tremendous force on the liner wall thereby increasing both friction and wear on the liner and the piston seal.

Applicant is aware of existing methods which tend to reduce the temperatures within the liner during pumping operations. For example, a water source is connected to the piston body which is ejected radially onto the liner wall during the backstroke. Applicant is further aware of existing pistons manufactured by Mission Manufacturing Company, utilizing a cotton dunk backing with a snap ring and piston endplate engagement as shown in the Composite Catalog, '54-'55 Ed, pg. 3314 and 157 Ed Vol. 2, pgs. 3472-3473, pages 4-5 of the Mission Fluid and Pump Parts Catalog of October 1975, by Reed Tool Company as shown on pages 4250 et seq. of the Composite Catalog, utilizing a nylon backing, Wooley Tool & Manufacturing Division of Cromalloy American Corporation utilizing a fabric backing, B.A.L. Ltd. "polypac" design as disclosed in "World Oil", January, 1961 issue page 58 utilizing nylon inserts for anti-extrusion and wear resistance, Stabylia Becap as disclosed in a trade magazine utilizing a homogeneous packing technique with varying hardness characteristics, the IADC Manual, Section 3, pages 1-2, Fluid King of United States Steel disclosed in the pamphlet ADOWD 8-75 utilizing a fabric backing, Harrisburg, Inc., disclosed in a company advertisement page 2597 also utilizing a fabric backing with lubrication fittings, National as shown in the company trade literature further utilizing a fabric reinforcement, Seal-Tite Manufacturing Company utilizing an elastomeric seal having a harder material bonded thereto which in turn is further backed by a fabric, Southwest utilizing a nonreplaceable sealing element, and pages 291 et seq. of a paper presented at the 1978 Drilling Technology Conference, by M. L. Rizzone of OILWELL, a Division of U.S. Steel. All of these designs incur a fraying or melting of the backing, a shifting of the piston within the liner and an extruding of the rubber seal into the extrusion gap thereby accelerating liner wear.

Applicant additionally wishes to cite to the examiner U.S. Pat. Nos. 2,819,131 to Lankford, 2,977,165 to Olson, 2,991,806 to Rocheville et al, 2,987,354 to Olson, 3,720,140 to Lee, all of which generally relate to the prior art herein described.

Copies of the above mentioned prior art, wherever available is included herewith in accordance with 37 CFR 1.97 and 1.98.

SUMMARY OF THE INVENTION

The present invention relates to a high pressure piston and piston seal suitable for use, by example and not by way of limitation, in a mud pump. The present invention also relates to the lower pressure slurry pumps utilized in moving abrasive slurries in mining and ore processing installations and the like. The piston includes a piston body which can be subdivided into a forward main body and a rear support threadedly engaged to the main body. A first annular recess in the piston body contains an annular seal and a gap filler having water channels therethrough. A second annular recess receives a rear wearband. The seal is formed of an elastomeric material which extends radially somewhat more than the piston body. Preferably acting on at least a portion of the seal is an expander or energizer which uniformly urges at least a portion of the seal into sealing engagement with the liner during piston operation. The expander means can be an integral part of the seal ring or a separate, specifically designed element such as an elastomeric spring, a metal spring, a pressure energized expander or even an enlarged aspect or lip on the seal ring which is compressed radially upon insertion of the piston into the liner. Immediately behind and abutting the seal is a gap filler which is substantially creep resistent axially but which has controlled radial creep. The gap filler controllably creeps radially in order to maintain constant intimate contact with the liner wall, thereby filling the extrusion gap between the smaller radius of the piston body and the larger radius of the liner. Within the gap filler is a plurality of water channels communicating a source of fluid from a passageway within the piston body to the cylinder liner. A wearband is disposed into an annular recess located at the rear support of the piston and extends radially outwardly substantially the same as the gap filler.

The wearband assists to align the piston within the liner and prevent metal to metal contact between the piston body and the liner. The wearband has a plurality of flowpaths traversing its axial width which are angled relative to the piston axis. The flowpaths permit abrasive particles to pass therethrough without being trapped between the outermost wearband surfaces contacting the liner which abrasively act upon the liner. The flowpaths are angled sufficiently that an abrasive particle which escapes from a flowpath has a short axial distance to travel during the piston stroke in order to enter a neighboring flowpath or to pass entirely from the wearband. The angled grooves further provide a 360° bearing effect against the liner contrary to axially aligned grooves found in conventional designs which produce hot spots in which only a portion of the wearband contacts the liner throughout the piston's stroke.

A water source under pressure is communicated through the piston body and through a plurality of angled water channels in the rear of the annular gap filler to produce a vortex washing effect on the liner to remove abrasive particles from the liner and to minimize the temperature of the liner, the seal, the gap filler and the wearband.

The use of a thin seal and gap filler permits their rear removal from the piston body, comprising a main body and removable rear support, by disengaging the rear support from the main body and exchanging the elements through the inner surface of the rear support. Thus, the elements can be easily replaced while the piston remains in the liner.

It is therefore an object of the present invention is to provide an annular gap filler abutting the rear of the seal, the gap filler having controlled radial creep characteristics whereby the outer cylindrical surface of the gap filler remains in intimate contact with the liner thereby closing the extrusion gap between the piston and the liner and minimizing the degradation of the seal ring.

Another object of the present invention is to provide a piston which has one or more radially expanding elements therearound which substantially remain in sliding contact with the liner of a pump thereby substantially reducing or eliminating metal to metal contact between the piston body and the liner.

Another object of the present invention is to provide a piston within a liner which piston is axially aligned with the liner and without metal to metal contact.

Yet a further object of the present invention is to provide a two-part piston body whereby as the two parts are disengaged from each other, the thin seal and gap filler can be removed from the rear of the piston through the rod orifice in the rear support and onto the piston rod for inspection and replacement.

An even further object of the present invention is to provide an axially compressed seal to minimize axial movement of the seal on the piston backstroke.

Another object of the present invention is to provide a wearband and a gap filler which have a useful life at least that of the liner.

Yet another object of the present invention is to provide a gap filler having a plurality of water channels communicating the inner surface to the outer surface suitable for communicating a liquid from the piston to the cylinder liner.

Another object of the present invention provides for the radial creep of the wearband thereby facilitating contact by the wearband with the liner.

Still another object of the present invention is to provide a piston in a cylinder wall having a wearband with angularly aligned flowpaths therein whereby the sliding contact of the wearband on the liner creates a series of flowpaths through the grooves which in turn allows a liquid under pressure to pass through the flowpaths and to create a vortex washing action on the liner wall.

An even further object of the present invention is the use of a thin wearband, seal and gap filler thereby reducing the heat retained within seal elements, the axial load on said elements and the rear support, and reducing the jetting of abrasive particles between the elements and the piston body.

These and other objects of the present invention will become apparent when read in light of the appended drawings, description of the preferred embodiment and the claims herein.

DESCRIPTION OF THE PREFERRED EMBODIMENT

Figure 1:
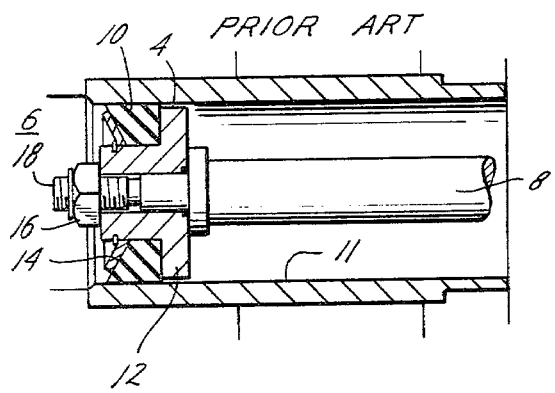
FIG. 1 is a side view in partial section of a conventional slush pump piston and seal within the cylinder liner.

Referring to the drawings, FIG. 1 shows a typical conventional single-stroke reciprocating slush pump piston 6 and seal 10 as the piston operates within the slush pump cylinder liner 11. A piston body 6 has a radially extending flange 12, the combination of which is secured to a piston rod 8, for example, by means of a nut 16 threadedly engaging a threaded portion 18 of the piston rod 8. A snap ring 14 abuts the forward surface of the seal 10 so that the seal is generally retained between the snap ring 14 and the flange 12. As the piston operates within the liner, an extrusion gap 4 develops as the flange 12 or backing wears. The extrusion gap occurs in a conventional piston in the vicinity of the seal ring, more particularly between the liner and a conventional backing or flange which results from a wearing away of the backing which fails to remain in intimate sliding contact with the liner. During the forward stroke, pressure bears against the exposed part of the seal 10 thereby causing the seal to compress axially and a portion of the seal to be extruded into an extrusion gap 4 located between the flange 12 and the adjacent liner surface 11. The extrusion gap is present because the metal piston body must be smaller in diameter than the liner for the piston to slide within the liner. On the powerstroke (and on the return stroke with supercharged pumps), the extruded portion of the seal 10 is frictionally trapped within the extrusion gap such that chunks of the seal 10 are broken off or nibbled away. As the seal 10 deteriorates, the metal flange 12 is allowed to contact the liner 11 producing a metal to metal contact which in turn accelerates the deterioration of the liner 11 and the seal 10.

Figure 1A:
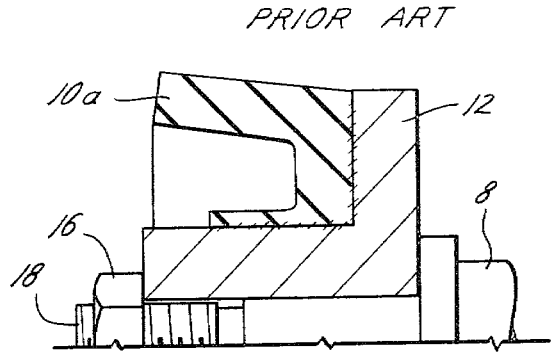
FIG. 1A is a partial side view in section of another embodiment of the prior art showing a seal, a rear metal flange and a means for forward removal of the seal.

As shown in FIG. 1A, the seal 10a can be structured so that radial compression of the seal is necessary in order to insert the seal and, hence, the piston into the liner. Nevertheless, the extrusion gap between the backing or flange 12 continues to permit the growth of an extrusion gap between the backing or flange 12 and the cylinder liner 11.

The present invention calls for an annular elastomeric seal which is abutted from the rear by an annular gap filler which has controlled radial creep characteristics which urge the gap filler ring into continuous contact with the liner such that an extrusion gap does not occur between the piston body and the liner is reduced.

Figure 2:
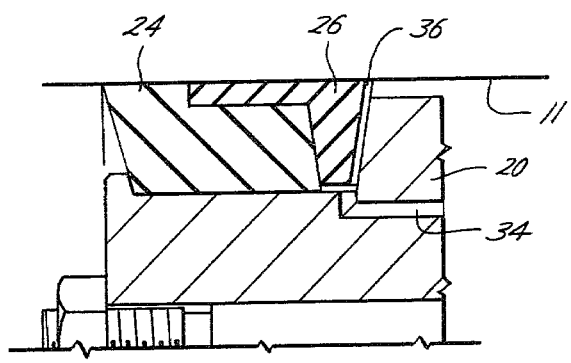
FIG. 2 is an enlarged sectional side view of an embodiment of a portion of the invention showing an upper front portion of the piston, an annular seal and a radially creeping gap filler.

FIG. 2 shows one format of the seal and gap filler combination of the present invention having the piston body 20 secured to a piston rod 22, an elastomeric seal ring 24 abutting a gap filler ring 26, for purposes discussed hereinafter, channels 36 in the rear of the gap filler communicating with liner 11 and with a fluid passageway 34.

Figure 3:
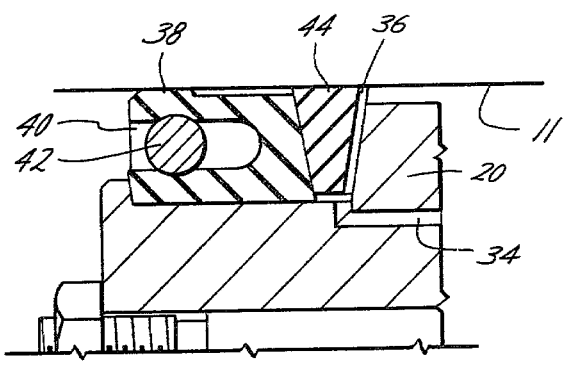
FIG. 3 is a side sectional view similar to FIG. 2 but disclosing a modified seal having an expander therein, and a modified, radially creeping gap filler.

FIG. 3 shows another diagrammatical representation of FIG. 2 having an elastomeric seal ring 38 with a recess 40 which accommodates an expander means 42. The expander means or energizer 42 can be a spring, a resilient material, a pressurized chamber and the like which urges at least a portion of the seal ring 38 into sealing contact with a cylinder liner 11. A gap filler 44, having substantially the same material characteristics as the gap filler 26 of FIG. 2, abuts the rear of the seal 38, hence closing the extrusion gap between the piston body 44 and the liner.

Figure 4:
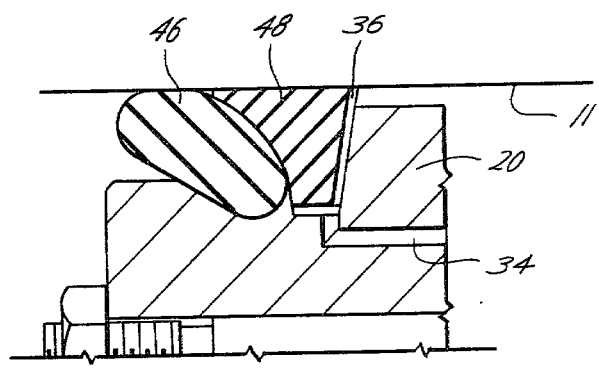
FIG. 4 is a view similar to FIGS. 2 and 3 but showing a modified seal, and a modified, radially creeping gas filler.

FIG. 4 shows yet another embodiment of FIG. 2 with a seal 46 in sealing contact with the liner 11 and having a gap filler 48 generally abutting the rear portion of the seal 46 such that the extrusion gap between the piston body and the liner is closed. In all three embodiments of FIGS. 2, 3 and 4, axial pressure is applied through the seals 24, 38 and 46 respectively causing the gap fillers to creep radially outwardly toward the liner thereby reducing the extrusion gap between the piston and the liner on the power stroke. In all three embodiments, the rear surface of the gap filler is angled from a radius to the rear of the piston so that forces applied to and transmitted through the seals assist in urging the corresponding gap filler radially outwardly into intimate sliding contact with the liner.

Figure 7:
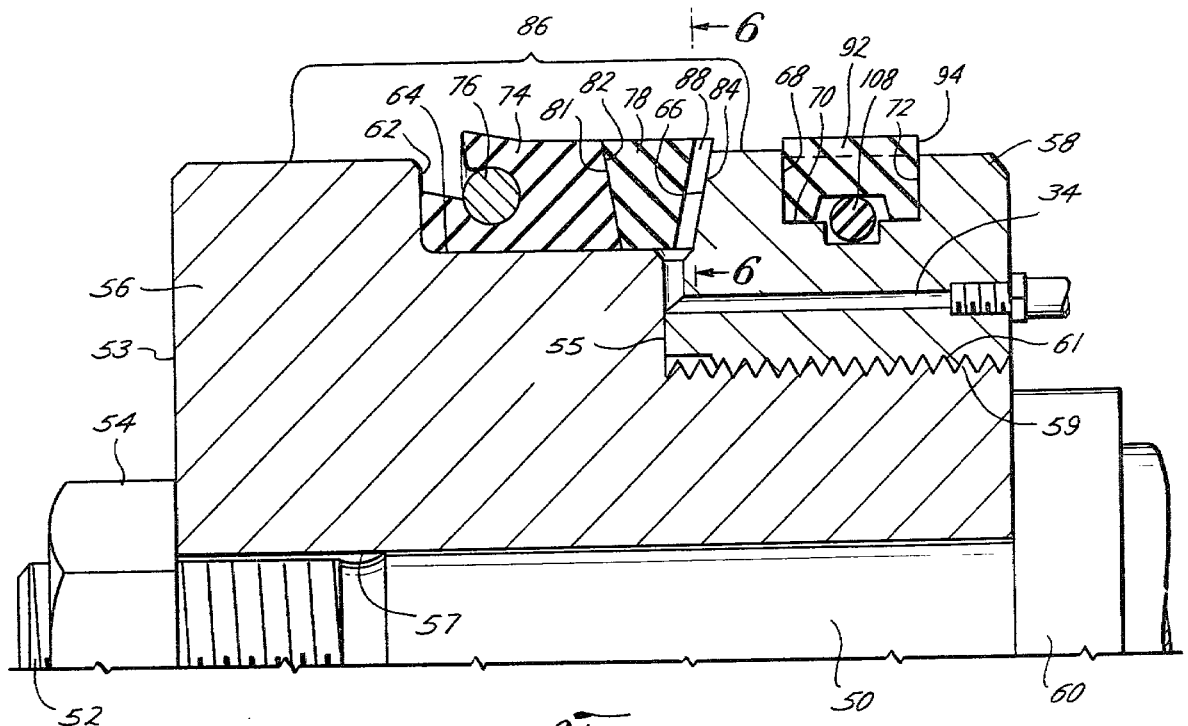
FIG. 7 is a partial diagrammatical side view in section of a preferred embodiment showing the first and second annular recesses in the piston body, the grooved, energized wearband, an energized seal, the gap filler, the water channels in the gap filler ring and the passageway through the piston communicating with a source of liquid under pressure.
Figure 8:
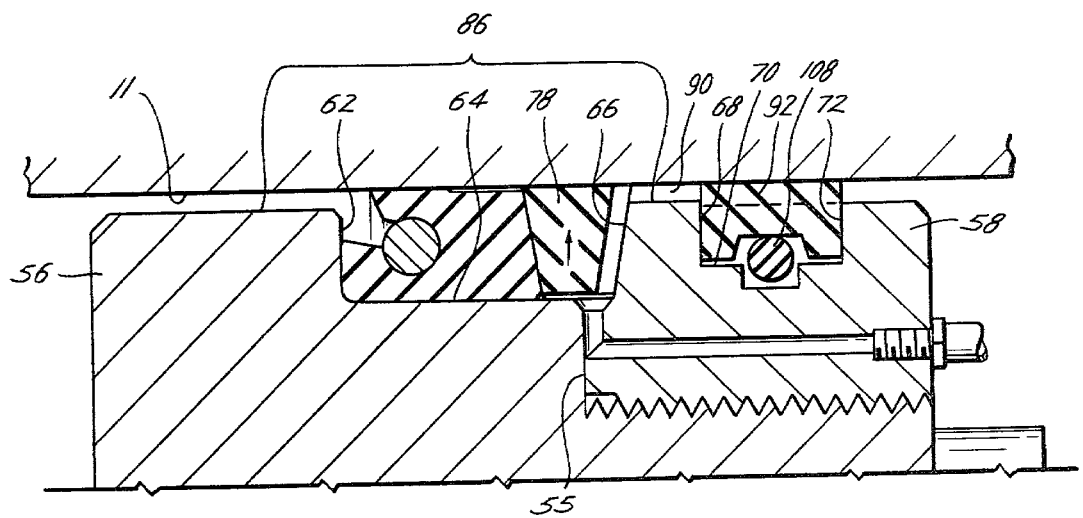
FIG. 8 is a diagrammatical side view of the upper portion of the piston disposed within the cylinder liner showing the radial compression of a seal lip, the radial creep of the gas filler and the alignment of the piston within the liner which is facilitated by means of the wearband.

A preferred embodiment of the present invention, diagrammatically showing a piston body, piston rod and various synergistic elements aligning and sealing the piston to the liner 11 is shown in FIGS. 7, 8, and 10. Referring to FIG. 7, a piston rod 50 has a rear radially extending flange 60, a threaded portion 52 onto which a compatible nut 54 can be threadedly engaged. The piston body comprises a main body 56 having a passageway 57 to receive the piston rod 50, and a rear support 58. Those skilled in the art will realize that the rear support 58 and the main body 56 may be secured to each other by any number of techniques, a threaded engagement being merely one satisfactory manner of doing so. Preferably, the main body 56 and the rear support 58 are threadedly engaged, to abut one another at the surfaces 55.

The main body 56 and the rear support 58 generally comprise the piston body. The main body 56 has an outer surface 86 at its forward portion and a threaded surface 61 having a smaller radius than the surface 86 located at the rear portion of the main body 56. The piston body has a first annular recess within the outer cylindrical surface of the piston body generally defined by the surfaces 62, 64 and 66. A second annular recess within the outer cylindrical surface of the piston body is disposed between surfaces of the piston body 68, 70 and 72.

The first annular recess includes a rear surface 66 which diverges radially rearwardly as shown in FIG. 7. The first annular recess contains an internally lubricated annular seal 74, a portion of which abuts the front surface 62. The seal 74 can, for example, receive an energizer 76 therein which urges at least a portion of the seal into intimate contact with the liner 11 as shown in FIG. 8. The gap filler 78 synergistically cooperates with many conventional seals, however, to produce the new result of substantially closing the extrusion gap located adjacent to and rearward of conventional seals.

Located within the first annular recess is the annular gap filler 78 having a front face 81 in intimate abutting contact with the rear face 82 of the seal ring 74 and a rear face 84, the faces 81 and 84 diverging radially outwardly. The gap filler is composed of a material which is creep resistent axially but which has controlled creep characteristics radially. Controlled radial creep with reduced axial creep can be obtained by proper orientation of the internal grain of the material used in the gap filler. The use of a glass-filled nylon material as well as its divergent configuration urges the gap filler into intimate sliding contact with the liner 11 as fluid forces are transmitted through the seal 74 onto the gap filler 78 during the power stroke. The gap filler 78 is preferably a wear resistent material which promotes reduced wear of the liner during the pumping operation. The purpose of the gap filler 78 is to insure that a portion of the extrusion gap located between the liner 11 and the outer cylindrical surface 86 of piston body is minimized in order that the seal ring 74 is not extruded on the power stroke into the extrusion gap and thereby nibbled away on the return stroke of the piston. Those skilled in the art will realize that the seal ring 74 and the gap filler ring 78 can comprise a single unit having progressively increasing creep resistence from the front to the rear of the unit, but for ease of manufacture and replacement, a separate seal ring 74 and gap filler ring 78 are shown.

Located within the annular gap filler 78 is a plurality of water channels 88. The water channels are more clearly shown in FIG. 6 taken along lines 7—7 of FIG. 7. The water channels can be aligned radially or obliquely, but an oblique alignment is preferred in order to create a vortex action on the liner 11 as the fluid is communicated through the passageway 34, the water channels 88 and into the gap 90 shown in FIG. 8.

A wearband 92 is located in the second annular recess of the piston body. Although there are many suitable shapes for the wearband, a preferred embodiment is a wearband which conformingly abuts the surfaces 68 and 72 of the second annular recess. A portion of the wearband 92, shown in FIGS. 5, 7, 8 and 9 by the number 94, includes a plurality of ridges which extend radially outwardly past the rear support 58 substantially equidistantly with the gap filler 78.

The ridges 94 are circumferentially spaced apart from one another by a corresponding plurality of flowpaths 96. The ridges 94 and flowpaths 96 are preferably disposed at an angle to the axis of the piston so that when a fluid is passed through the plurality of flowpaths, a vortex is created so that the entire circumference of the liner wall 11 is washed during the operation of the piston. For example, a fluid such as water is forcefully communicated through the passageway 34 of the piston, through the plurality of water channels 88 disposed within the annular gap filler 78, thence into the annular gap 90 and finally through the flowpaths 96 of the wearband 92. Preferably, the direction of the vortex induced by the flowpaths 96 of the wearband 92 is the same direction as the vortex induced by the flow of the fluid through the water channels 88 in the gap filler 78. Hence, an effective washing vortex action is induced by the water channels 88 and reinforced by the flowpaths 94 so that the circumference of the liner 11 is effectively washed and cooled.

Preferably, the angle of alignment of the ridges 94 and flowpaths 96 is sufficient to produce a circumferential bearing effect; that is, during the reciprocal axial motion of the piston, the complete circumference of the liner wall 11 which receives and contacts the wearband 92 is contacted by at least a portion of one or more of the ridges 94. The unusual cooperation of the ridges 94, therefore, eliminates the "hot spots" of the prior art. The "hot spots" arise when the ridges are axially aligned such that the ridges reciprocate axially upon a particular section of the liner while the adjacent flowpaths wash and cool their respective areas of the liner. Those areas of the liner in contact with the axially aligned ridges wear more quickly and experience locally higher temperatures than those areas of the liner cooled by the flowpaths. In the present invention, however, the washing and cooling action generated by the vortex is substantially uniform. Moreover, the circumferential bearing effect of the angularly aligned ridges 94 produce a bearing effect which tends to distribute more evenly the wear of the wearband 92 on the liner 11.

The angular alignment of the ridges 94 further reduces the effects of wear on the liner 11 which occurs when abrasive particles become disposed between the outer circumference of a ridge and the liner wall. With conventional elements, when a particle is lodged between the outer surface of an element and the liner, it is worked fore and aft against the liner as the piston reciprocates within the liner. Hence, wear on the liner is accelerated by the abrasive effects of the particles on the wall.

Figures 5, 6:
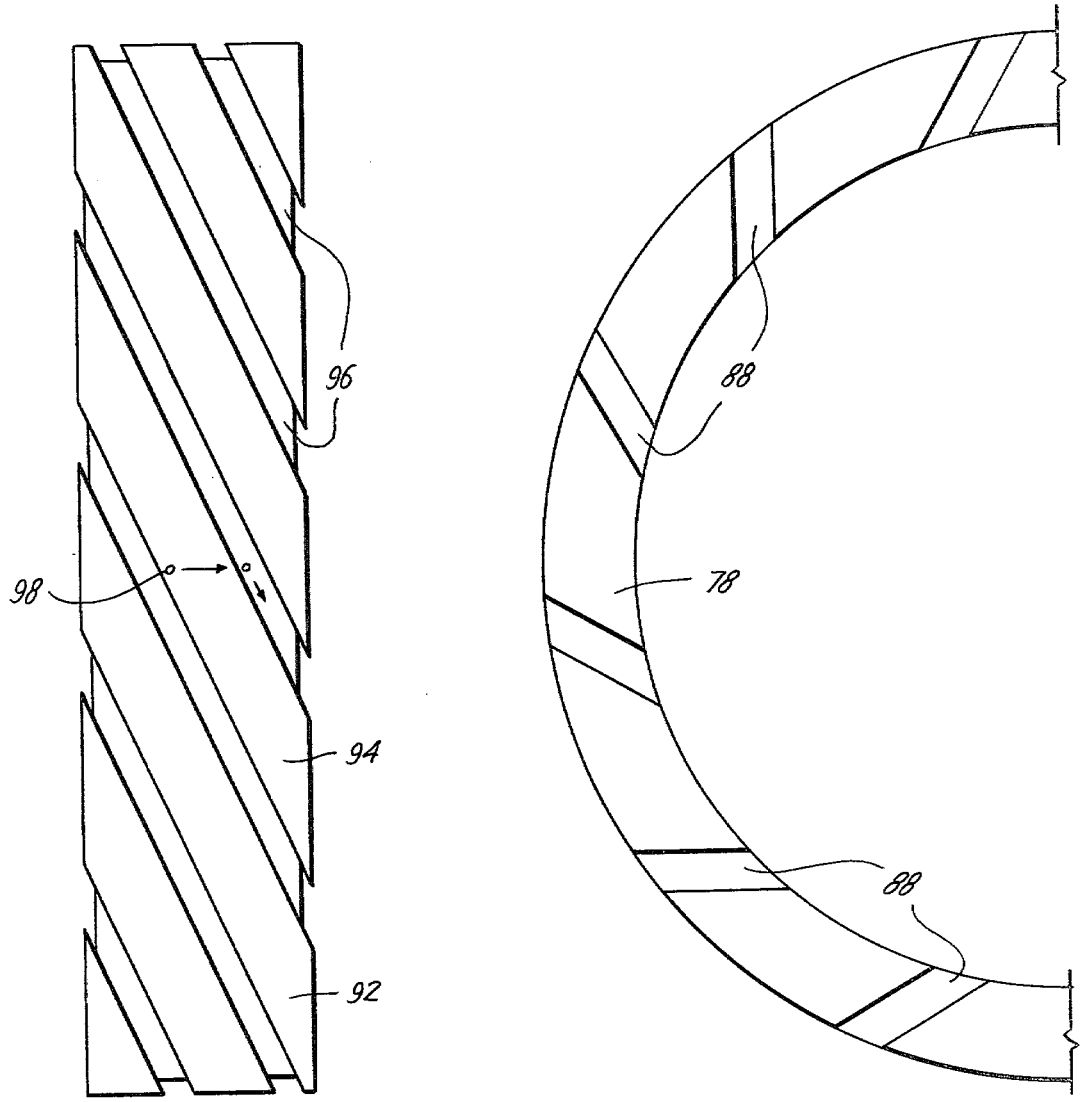
FIG. 5 is an enlarged radial view of the wearband showing a plurality of spaced apart flowpaths within the outer cylindrical surface of the wearband, a particle in first position on the outermost cylindrical surface, the same particle in a second position within one of the flowpaths and an arrow depicting the freedom path taken by the particle in moving from the first position to the second position.
FIG. 6 is a rear axial view of the gap filler of the invention showing the water channels aligned obliquely from a radius and communicating through the gap filler to the outer surface of the ring.

In the present invention, however, the abrasive effects caused by particles which have migrated between the outer circumference of the ridges 94 and the liner wall 11 are minimized. Referring to FIG. 5, a particle 98 is shown on the outer circumference of a ridge 94. On the return and power stroke of the piston, however, the angular alignment of the ridges 94 and flowpaths 96 is such that as the particle 98 traverses axially towards the rear of the wearband 92, it is again received by another flowpath 96 and effective exhausted to the rear of the wearband by the vortex washing action of the fluid within the flowpath. Consequently, although the migration of a particle into an area between the outer circumference of the ridges and the liner is perhaps unavoidable, the deleterious abrasive effect of the migratory particles is greatly reduced.

Figure 9:
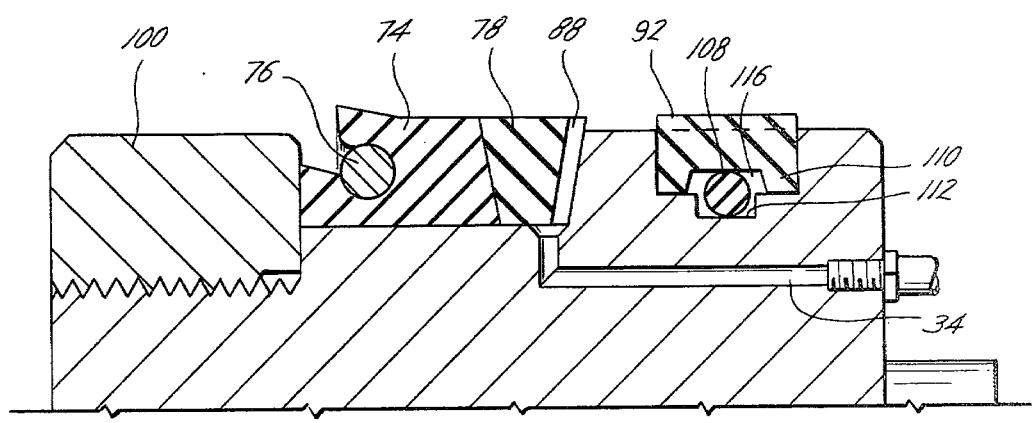
FIG. 9 is a side view and partial section diagrammatically showing a frontally removable portion of the piston body threadedly engaged to the remainder of the piston.

As shown in FIGS. 7–9, the seal 74 can be energized by applying the seal in tension around the piston body. Hence, heat imparted to the seal ring 74 by the fluid pressure and friction tends to cause the seal ring to relax thereby reducing the tendency present in conventional seal rings to expand radially outwardly, thus increasing the friction between the seal and the liner. The seal 74 preferably abuts the front surface 62 in order to minimize axial movement of the seal on the piston body during the return stroke.

Because the annular seal 74 and the annular gap filler 78 are thin and thus easily manipulated, these elements can be removed toward the rear of the assembly, unlike conventional slush pump pistons. Rear removal requires the rear support 58 to be threadedly disengaged from the main body 56, at which time the elements can be removed from the piston body through the inner diameter in the rear support defined by the threaded surface 59. The employment of a two-piece piston body and a relatively thin seal 74 and gap filler 78 makes rear removal of those elements possible on some presently existing piston rods and flanges. For instance, utilizing American Petroleum Institute terminology, an SA2 rod having a two inch outer diameter and one inch thread is adaptable to a rear removed three and one-half inch outer diameter piston. Similarly, an SA4 rod having a three and one-quarter inch outer diameter with a one and one-half inch thread and a one and one-half inch main rod diameter is compatible with four and one-half inch piston body thereby permitting rear removal. Similarly, a non-API rod having a three and seven-eighths diameter with a one and one-half inch thread and a one and five-eighths main rod diameter is compatible with a five and one-half inch piston body to permit rear removal.

As shown in FIGS. 7 and 8, the rear support 58 can be removed rearwardly from the main body 56. As shown in FIG. 9, the front element 100 can be removed forwardly from the remainder of the piston body. Those skilled in the art will realize that combination of FIGS.

7-9 can be utilized so that both front and rear removal is possible.

Those skilled in the art will further realize that the gap filler 78 and the wearband 92, urged radially outwardly by their diverging surfaces, can furthermore be urged radially outwardly in any suitable means including mechanical springs, pressure chambers, pressurized lubricant reservoirs and the like.

As shown in FIGS. 7-9, in order to urge more fully the wearband 92 radially outwardly into contact with the liner 11, a bias means such as, for example, a pressure source, a spring or a resilient O-ring 108, can be disposed radially inwardly of the wearband. Preferably, the wearband 92 has a pair of arms 110 projecting radially inwardly from the remainder of the wearband which abut a pair of shoulders 114 formed as a part of the rear support 58. An annular recess 112 spaces apart the pair of shoulders 114 so that when the arms 110 abut or are in proximity to the shoulders 114, a chamber 116 is defined within which is disposed the bias means 108. The abutment of the arms 110 against the shoulders 114 insures that the wearband 92 will not be compressed radially inwardly to the point that sufficient contact by the wearband 92 with the liner 11 is sacrificed, thereby encouraging the proper alignment of the piston within the liner.

Because the flowpaths 96 in the wearband 92 are more restrictive to flow than the water channels 88 or the passageway 34, the annular gap 90 is substantially filled with fluid at all times of operation. Accordingly, the fluid in the annular gap 90 acts as a hydrostatic liquid seal which tends to prevent air in the system from passing between the piston and the liner to the pressure side on the backstroke.

Hence, the present invention as shown and described herein clearly fulfills and meets all the objectives as noted heretofor. For purposes of the present application, applicant has shown and described a preferred embodiment. It is well understood that numerous equivalent structures, combinations of structures, combination of elements and materials are covered within the specification, drawings and appended claims and, therefore, fall both within the scope and the spirit of the present invention.

What is claimed is:

1. In a reciprocating mud pump having a cylinder liner and a piston rod, a piston slidably received within the liner comprising
   a. a main body having a substantially cylindrical outer surface and a substantially cylindrical threaded surface of a smaller radius than the outer surface,
   b. a rear support having a substantially cylindrical outer surface extending radially outwardly approximately equally to the outer surface of the main body around an axis and having a threaded inner surface compatible with the threaded surface of the main body so that said rear support is threadedly received by the main body to form a piston body around an axis said piston body having an outer surface of less diameter than that of the liner,
   c. a means to secure the piston body to the piston rod,
   d. a first annular recess disposed within the outer cylindrical surface of the piston body, said recess extending longitudinally from a front surface to a rear surface,
   e. an elastomeric seal disposed substantially within a portion of the first annular recess and extending radially outwardly of the piston body, said seal having a diverging rear surface and at least a portion of said seal abutting at least a portion of the front surface of the first annular recess,
   f. a means to urge the seal into sealing contact with the liner,
   g. a gap filler having a diverging front face abutting the diverging rear surface of the seal, and a diverging rear face which carries a plurality of water channels communicating generally radially through the gap filler,
   h. a means to urge the gap filler into intimate contact with the liner as the piston reciprocates on a power stroke thereby reducing the gap between the piston body and the liner and preventing a portion of the seal from extruding to a location between the liner and the piston body,
   i. a source of fluid under pressure,
   j. a second annular recess disposed within the outer surface of the rear support of the piston body, said second annular recess spaced apart from the first annular recess by a portion of the piston body,
   k. an annular wearband substantially displacing the second annular recess, the peripheral surface of said wearband extending radially outwardly equidistantly with the gap filler into sliding contact with the liner, said wearband including a plurality of flowpaths traversing the wearband at an angle from the piston axis and,
   l. a means to bias the wearband radially outwardly.
   m. a means to communicate the source of fluid under pressure (i) through the piston and thence through the channels in the gap filler onto a portion of the liner which is disposed substantially between the gap filler and the wearband, and thence through the flowpaths in the wearband so that on the power stroke the seal is in sliding contact with the liner, the axial forces of the mud upon the seal urges the seal against the gap filler, the diverging front and rear faces of the gap filler permit the gap filler to be urged into sliding contact with the liner to eliminate extrusion of the seal between the liner and the gap filler, the wearband is in sliding contact with the liner, and the fluid under pressure passes through the channels in the gap filler, contacts the liner between the gap filler and the wearband, and through the angled flowpaths in the wearband thereby inducing a vortex washing action on a portion of the liner disposed rearward of the wearband.

2. The device of claim 1 wherein the means (c) is an axial passageway extending through the main body to receive the piston rod, a flange on the piston rod and a nut threadedly engaged to the piston rod so that the piston body is disposed around the rod and between the nut and the flange.

3. The device of claim 1 wherein the means (f) is the compressing of the elastomeric seal as the piston is received within the liner.

4. The device of claim 1 wherein the means (f) is a resilient energizer disposed radially inwardly of and urging at least a portion of the seal radially outwardly.

5. The device of claim 1 wherein the water channels are uniformly and obliquely aligned from a radius when viewed in cross section thereby creating a vortex action on the liner as a fluid is flowed through said water channels.

6. The device of claim 1 wherein the means (h) is the radial alignment of a glass-like grain within the gap filler thereby causing the gap filler to creep radially outwardly when heated.

7. The device of claim 1 wherein the means (l) is a resilient "O"-ring disposed between the piston body and the wear band.

8. The device of claim 1 wherein the means (l) is a mechanical spring disposed between the wearband and the piston body.

9. The device of claim 1 wherein the second annular recess includes a substantially radial front surface and rear surface.

10. The device of claim 9 wherein the wearband has a front and a rear surface closely conforming to the front and rear surfaces respectively of the second annular recess.

11. The device of claim 10 wherein the means (l) is a resilient annular O-ring disposed between the wearband and the piston body.

12. The device of claim 1 wherein a portion of the piston body is threadedly secured to the remainder of said piston body and abuts at least a portion of the front surface of the seal wherein as said portion is threadedly removed from the remainder of the piston body, the seal and the gap filler can be removed from the piston body.

13. In a reciprocating mud pump having a cylinder liner, a piston rod having a threaded end and a radially extending flange, a piston slidably received within the liner comprising:
 a. a substantially cylindrical piston body including
   (i) a main body having a substantially cylindrical outer surface and a substantially cylindrical threaded surface of a smaller radius than the outer surface, and
   (ii) a rear support having a substantially cylindrical outer surface extending radially outwardly approximately equally to the outer surface of the main body and having a threaded inner surface compatible with the threaded surface of the main body so that said rear support is threadedly received by the main body to form the piston body.
 b. a means to secure the piston body to the piston rod,
 c. a first annular recess disposed within the outer cylindrical surface of the piston body, said recess extending longitudinally from a front surface to a rear surface which diverges from a radius in a direction away from said front surface,
 d. a second annular recess disposed within the outer surface of the rear support of the piston body and spaced apart from the first annular recess by a portion of the piston body, said second annular recess having a front surface and a rear surface said second annular recess further including a pair of shoulders therein which are spaced apart by an additional smaller recess,
 e. an axially aligned passageway extending through the piston body and of sufficient diameter to receive the piston rod,
 f. an elastomeric seal disposed within a portion of the first annular recess, said elastomeric seal having a front surface abutting the front surface of the first annular recess, and a diverging rear surface, said rear surface diverging radially outwardly from a radius toward the front surface of said first annular recess,
 g. an annular gap filler with a front face and a rear face diverging radially outwardly from one another, said front face intimately abutting the diverging rear surface of the seal, said rear face slidingly abutting the rear surface of the first annular recess, said rear face including a plurality of recessed water channels therein, said gap filler extending radially outwardly of the piston body,
 h. a wearband having a front surface and a rear surface conforming to the front and rear surfaces respectively of the second annular recess, a pair of arms projecting radially inwardly to abut the corresponding shoulders of the second annular recess, said wearband extending radially outwardly of the piston body substantially equidistantly with the gap filler, said wearband further including a plurality of recessed flowpaths within an outer portion of the wearband, said flowpaths extending across the longitudinal width of the wearband and aligned obliquely to the axis of the piston,
 i. a means to bias the wearband radially outwardly, said means disposed between the pair of arms the wearband and the pair of shoulders of the second annular recess,
 j. a passageway within the piston body to communicate a source of fluid to the recessed water channels of the gap filler, said water channels communicating the fluid to a portion of the outside surface of the piston body disposed between the first and second annular recesses and the cylinder liner and thence through the oblique flowpaths of the wearband,
 k. the plurality of flowpaths along the wearband being more restrictive to flow than the water channels recessed into the rear surface of the gap filler so that as a fluid is communicated through the water channels under pressure, a hydrostatic seal is formed between the cylinder liner and a portion of the outside surface of the piston body disposed between the first and second annular recesses and,
whereby as the piston reciprocates on the piston rod within the cylinder liner, the annular seal slidingly and sealingly contacts the cylinder liner, the gap filler is urged radially outwardly into sliding contact with the cylinder liner, the wearband is urged radially outwardly into sliding contact with the cylinder liner, said piston body being substantially axially aligned within the cyliner liner.

* * * * *

UNITED STATES PATENT AND TRADEMARK OFFICE
CERTIFICATE OF CORRECTION

PATENT NO. : 4,270,440

DATED : June 2, 1981

INVENTOR(S) : Edwin C. Lewis II

It is certified that error appears in the above—identified patent and that said Letters Patent is hereby corrected as shown below:

Column 4, line 38 and line 62, "gas" should read -- gap --.

Signed and Sealed this

First Day of September 1981

[SEAL]

Attest:

GERALD J. MOSSINGHOFF

Attesting Officer     Commissioner of Patents and Trademarks